(12) United States Patent
Mann

(10) Patent No.: US 8,985,565 B2
(45) Date of Patent: Mar. 24, 2015

(54) PIPE FITTING SYSTEM

(76) Inventor: Robert Mann, Brandon, FL (US)

(*) Notice: Subject to any disclaimer, the term of this patent is extended or adjusted under 35 U.S.C. 154(b) by 202 days.

(21) Appl. No.: 13/591,700

(22) Filed: Aug. 22, 2012

(65) Prior Publication Data

US 2013/0147102 A1 Jun. 13, 2013

Related U.S. Application Data

(60) Provisional application No. 61/526,892, filed on Aug. 24, 2011.

(51) Int. Cl.

| | |
|---|---|
| *B25B 1/20* | (2006.01) |
| *B23Q 1/25* | (2006.01) |
| *B25B 1/22* | (2006.01) |
| *B21D 39/03* | (2006.01) |
| *B23P 11/00* | (2006.01) |
| *B23P 15/00* | (2006.01) |
| *F16L 23/00* | (2006.01) |
| *B23K 37/053* | (2006.01) |
| *B25B 27/10* | (2006.01) |

(52) U.S. Cl.
CPC ........... *B23K 37/0536* (2013.01); *F16L 23/003* (2013.01); *B25B 27/10* (2013.01)
USPC ................... 269/40; 269/55; 269/71; 29/714; 29/430

(58) Field of Classification Search
USPC .............................. 269/40, 58, 55, 71, 389 R
See application file for complete search history.

(56) References Cited

U.S. PATENT DOCUMENTS

| | | | | | |
|---|---|---|---|---|---|
| 2,452,985 | A | * | 11/1948 | Bourdette | 269/40 |
| 2,682,244 | A | * | 6/1954 | Fortner | 269/45 |
| 2,699,601 | A | * | 1/1955 | Darnell | 269/40 |
| 3,847,703 | A | * | 11/1974 | Kaiser | 156/294 |
| 4,142,702 | A | * | 3/1979 | Lamboo | 248/174 |
| 4,262,943 | A | * | 4/1981 | Armstrong | 285/420 |
| 4,750,662 | A | * | 6/1988 | Kagimoto | 228/44.5 |
| 5,094,435 | A | * | 3/1992 | Depperman et al. | 269/43 |
| 5,165,160 | A | * | 11/1992 | Poncelet | 29/464 |
| 5,573,229 | A | * | 11/1996 | Lycan | 269/49 |
| 6,990,712 | B2 | * | 1/2006 | Shelton | 29/237 |
| 8,718,222 | B2 | * | 5/2014 | Abura et al. | 376/372 |
| 2005/0120531 | A1 | * | 6/2005 | Shelton | 29/272 |
| 2010/0284738 | A1 | * | 11/2010 | Robinson et al. | 403/408.1 |
| 2012/0324688 | A1 | * | 12/2012 | Nohmi | 29/237 |

FOREIGN PATENT DOCUMENTS

| | | | |
|---|---|---|---|
| DE | 102011106620 A1 | * 12/2011 | |
| GB | 2139365 A | * 11/1984 | |
| WO | WO 9821514 A1 | * 5/1998 | F16L 37/00 |

* cited by examiner

*Primary Examiner* — Alvin Grant
(74) *Attorney, Agent, or Firm* — Shumaker, Loop & Kendrick, LLP

(57) ABSTRACT

A pipe fitting system to fit a selected one of one or more pipes, one or more flanges and one or more fittings that includes one or more fitting cradles, a fitting rest with a pair of apertures, the fitting rest is removably secured to the bottom fitting bed and a plurality of cinch chains each with a first end, the cinch chains are used to secure one or more fitting cradles to a fitting beam. The system also includes a high tensile steel racquet wrench to loosen and to tighten the bolts of the pipe fitting system.

20 Claims, 6 Drawing Sheets

PIPE FITTING SYSTEM

This application claims priority to U.S. Provisional Application 61/526,892 filed on Aug. 24, 2011, the entire disclosure of which is incorporated by reference.

TECHNICAL FIELD & BACKGROUND

Pipe contractors are always looking for new ways to improve on setting pipe. Setting pipe is a highly skilled procedure that often takes many years of experience to do properly.

The present invention generally relates to a fitting system. More specifically, the invention is a pipe fitting system.

It is an object of the invention to provide a pipe fitting system that allows a user to relatively more quickly, easily and accurately fit one or more pipes, one or more flanges and one or more fittings.

It is an object of the invention to provide a pipe fitting system that allows a user to fit one or more pipes, one or more flanges and one or more fittings alone without the need for assistance from one or more additional persons.

It is an object of the invention to provide a pipe fitting system that allows a user to relatively more consistently align, level, square and plumb one or more pipes, one or more flanges and one or more fittings.

What is really needed is a pipe fitting system that allows a user to relatively more quickly, easily and accurately fit one or more pipes, one or more flanges and one or more fittings that allows a user to fit one or more pipes, one or more flanges and one or more fittings alone without the need for assistance from one or more additional persons that allows a user to relatively more consistently align, level, square and plumb one or more pipes, one or more flanges and one or more fittings.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
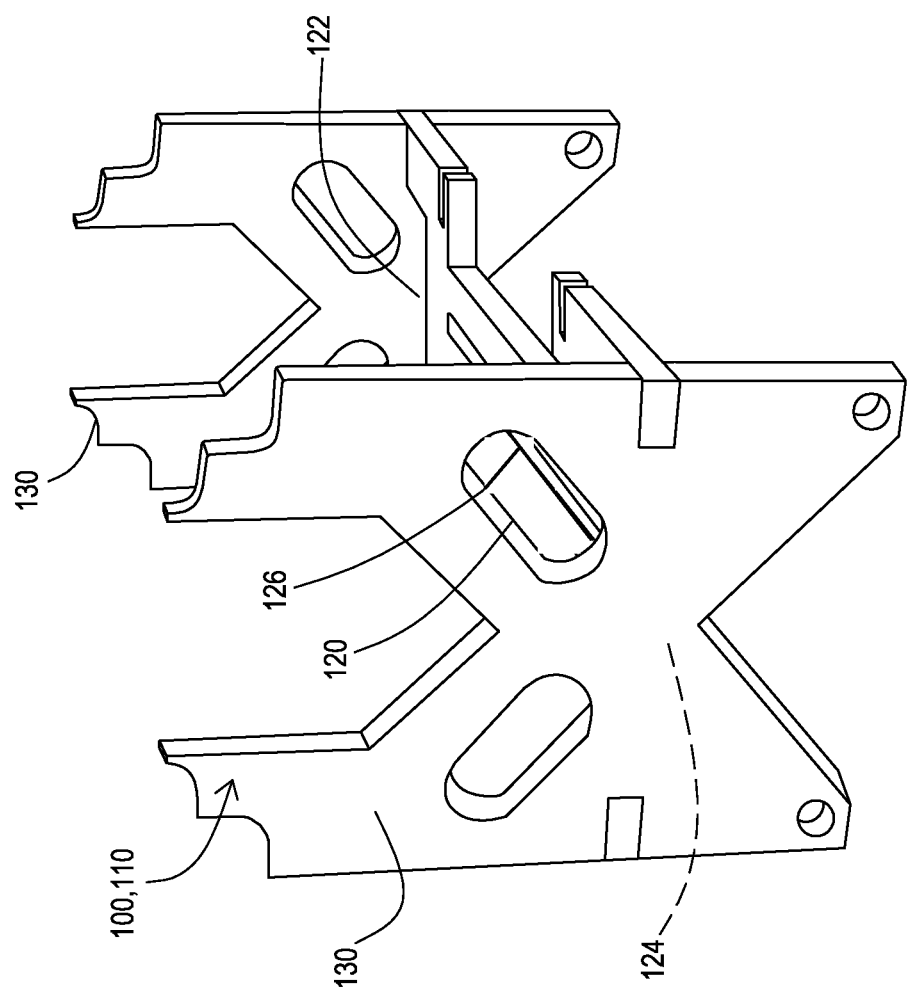
FIG. 1 illustrates a side perspective view of a fitting cradle of a pipe fitting system, in accordance with one embodiment of the present invention.

FIG. 1 illustrates a side perspective view of a fitting cradle 110 of a pipe fitting system 100, in accordance with one embodiment of the present invention.

The pipe fitting system 100 includes a fitting cradle 110. The pipe fitting system 100 can include more than one fitting cradles 110 although any suitable number of fitting cradles 110 can be utilized in any suitable orientation. The one or more fitting cradles can be set at an approximately 90 degree angle, set at an approximately 180 degree angle or any other suitable angle.

The fitting cradle 110 includes a bottom fitting bed 120 and a pair of positioning plates 130. The fitting cradle 110 fits one or more pipes, one or more flanges or one or more fittings as illustrated in subsequent figures. The bottom fitting bed 120 has a first end 122, a second end 124 and an elongated centered slot 126. The pair of positioning plates 130 is perpendicularly attached to the first end 122 and the second end 124 of the bottom fitting bed 120. More specifically, the pair of positioning plates 130 is perpendicularly TIG welded with tungsten inert gas with argon gas shielding to the first end 122 and the second end 124 of bottom fitting bed 120. The bottom fitting bed 120 and a pair of positioning plates 130 are cut with a relatively high precision CNC laser machine.

Figure 2A:
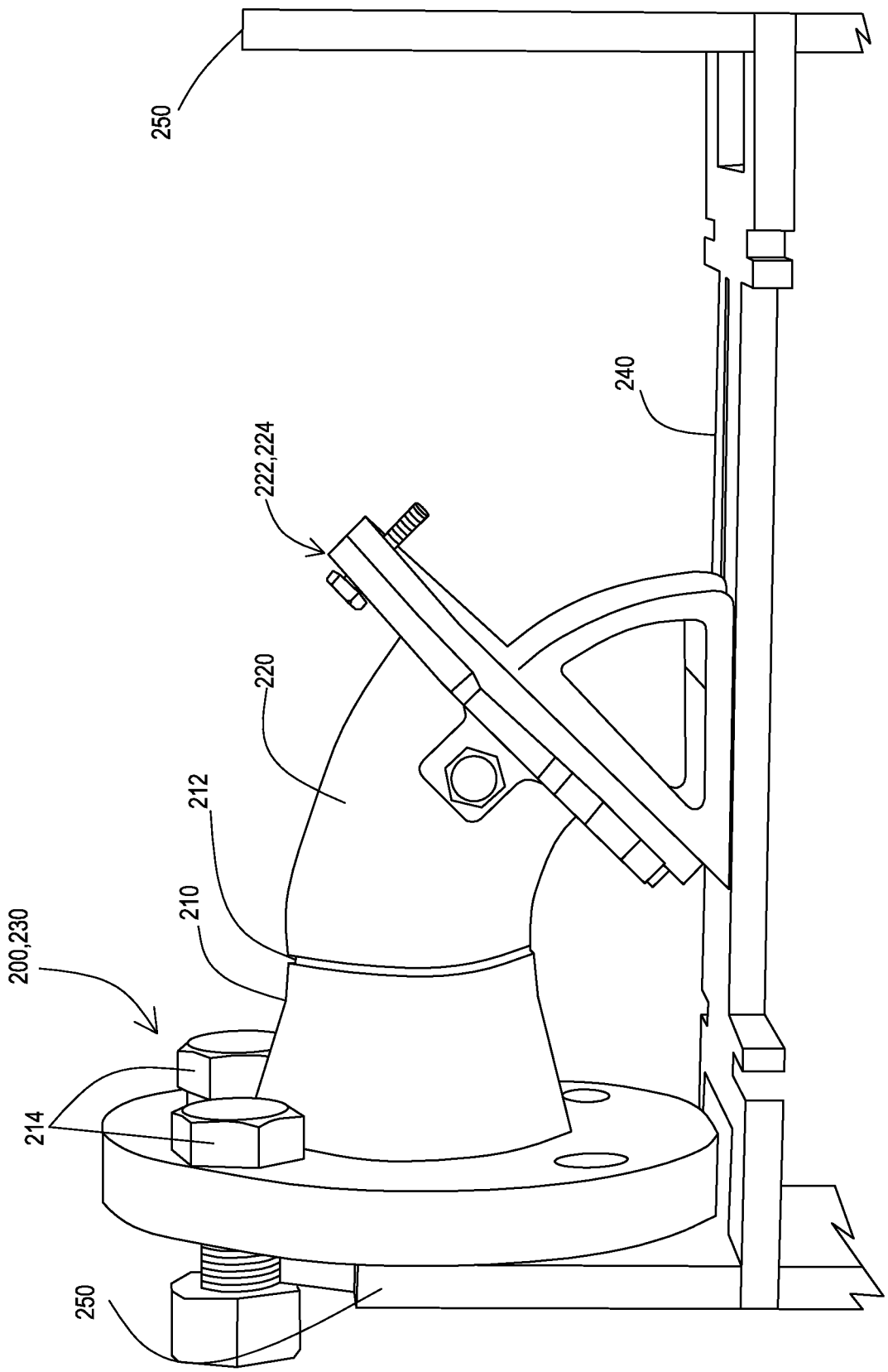
FIG. 2A illustrates a front environmental perspective view of a pipe fitting system with a flange and an elbow, in accordance with one embodiment of the present invention.

FIG. 2A illustrates a front environmental perspective view of a pipe fitting system 200 with a flange 210 and an elbow 220, in accordance with one embodiment of the present invention. FIG. 2A includes a fitting cradle 230 with a bottom fitting bed 240 and a pair of positioning plates 250 that are similar to the fitting cradle 110, the bottom fitting bed 120 and the pair of positioning plates 130 illustrated and described in FIG. 1 and its description.

The flange 210 has an aperture 212 and is removably secured by a pair of nuts and bolts 214 to one of the pair of positioning plates 250. The elbow 220 is positioned adjacently to the aperture 212 of the flange 210 to enable a user to weld the elbow 220 to the aperture 212 of the flange 210. The elbow 220 is secured by a fitting rest 222 that is an approximate 45 degree fitting rest 224 although the fitting rest 222 can be any suitable angled fitting rest. The fitting rest 222 receives and secures the elbow 220 adjacently to the aperture 212 of the flange 210. Additional details regarding the fitting rest 222 are illustrated and described in subsequent FIG. 2B.

Figure 2B:
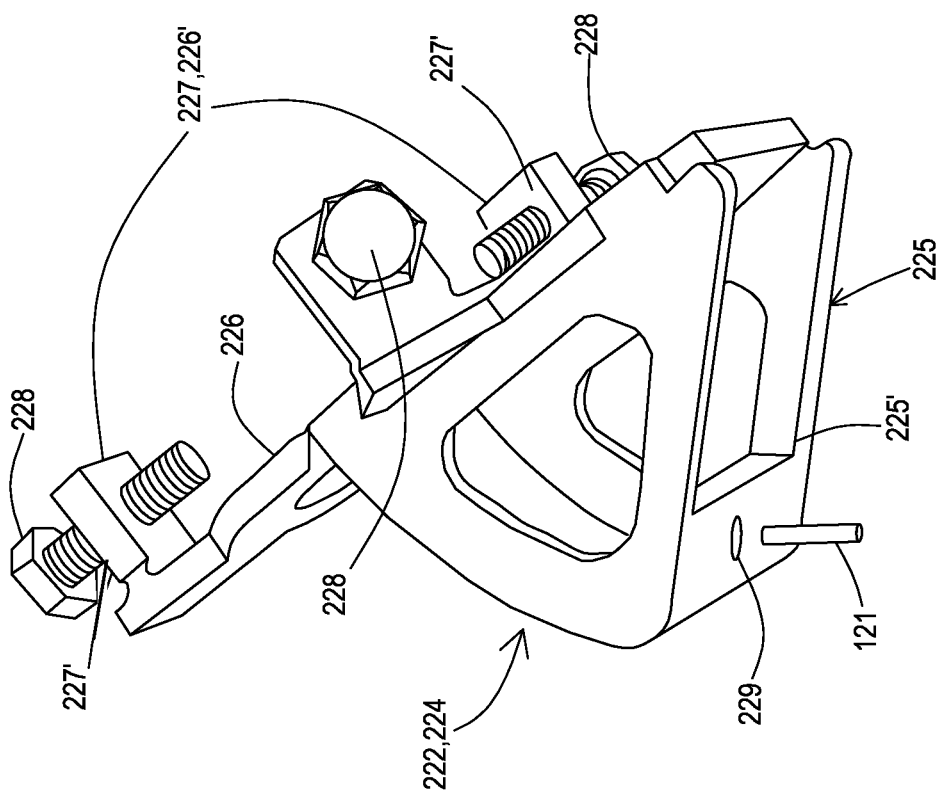
FIG. 2B illustrates a side perspective view of a fitting rest of a pipe fitting system, in accordance with one embodiment of the present invention.

FIG. 2B illustrates a side perspective view of a fitting rest 222 of a pipe fitting system 200, in accordance with one embodiment of the present invention.

Figure 2C:
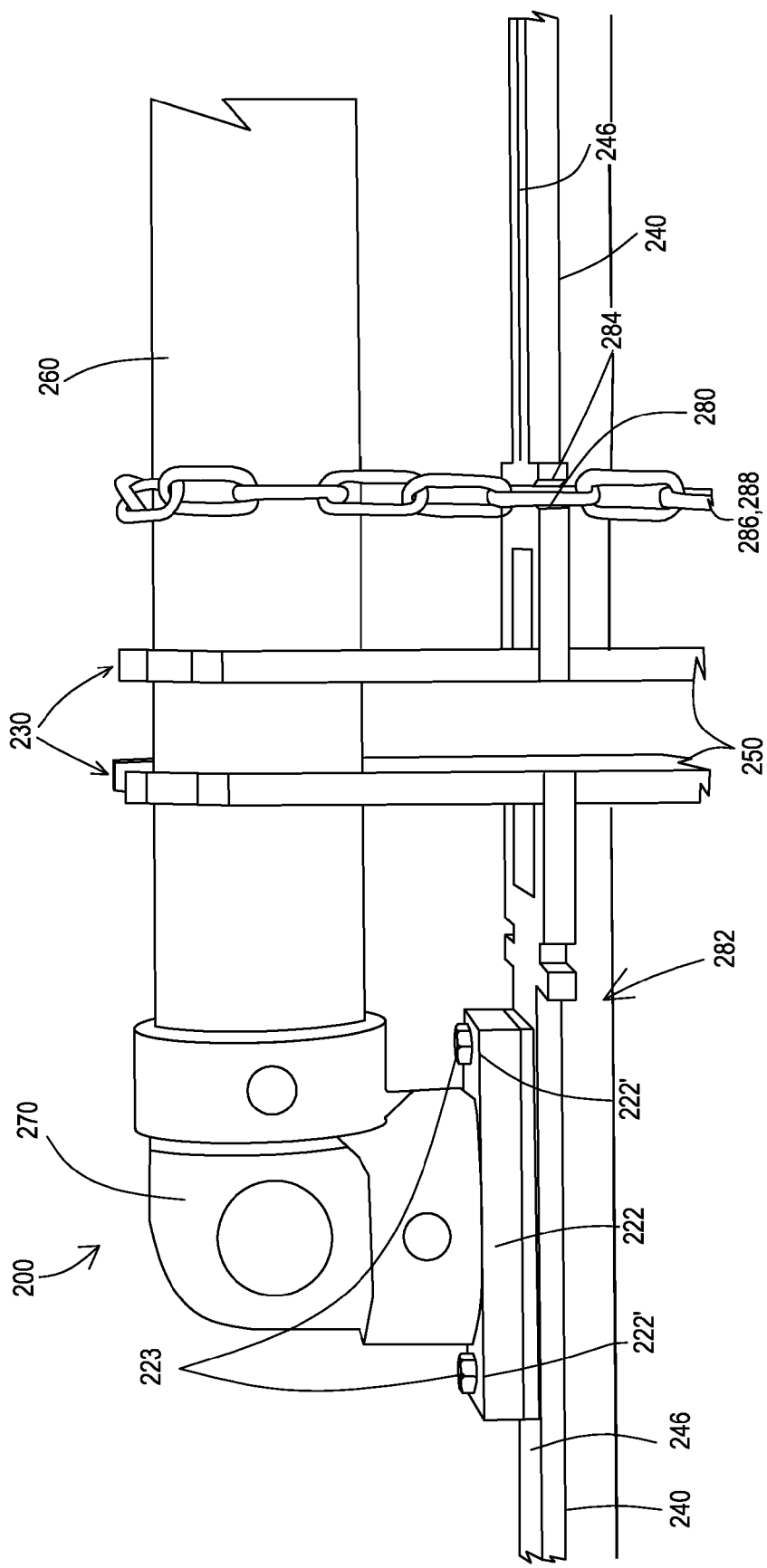
FIG. 2C illustrates a front environmental perspective view of a pipe fitting system with a pipe and a fitting, in accordance with one embodiment of the present invention.

The fitting rest 222 illustrates and describes the 45 degree fitting rest 224 previously illustrated and described in FIG. 2A. The 45 degree fitting rest 224 includes a flat triangular base 225, an attachment receiving surface 226, three screw receiving plates 227 and three releasable attachment screws 228. The flat triangular base 225 is placed on the elongated centered slot 126 of the bottom fitting bed 120. The triangular base 225 is removably attached to the bottom fitting bed 120 with a securing screw and bolt 121 that is extended through an aperture 229 disposed on a triangular base bottom 225' and the elongated centered slot 126 of the bottom fitting bed 120. The attachment receiving surface 226 is in contact with a pipe (FIG. 2C, 260), a flange 210 or a fitting (FIG. 2C, 270). The three screw receiving plates 227 are equal distance around a front portion 226' of the attachment receiving surface 226 with a threaded aperture 227' disposed on each of the three screw receiving plates 227. The three releasable attachment screws 228 are threaded through the threaded aperture 227' disposed on each of the three screw receiving plates 227 to apply pressure on the pipe (FIG. 2C, 260), a flange 210 or a fitting (FIG. 2C, 270) to secure the pipe (FIG. 2C, 260), a flange 210 or a fitting (FIG. 2C, 270) to the attachment receiving surface 226.

FIG. 2C illustrates a front environmental perspective view of a pipe fitting system 200 with a pipe 260 and a fitting 270, in accordance with one embodiment of the present invention. FIG. 2C includes a fitting cradle 230 with a bottom fitting bed 240 and a pair of positioning plates 250 that are similar to the fitting cradle 230, the bottom fitting bed 240 and the pair of positioning plates 250 illustrated and described in FIG. 2A and its description.

FIG. 2C additionally includes a fitting rest 222, a pipe 260, a fitting 270 and a plurality of cinch chains 280. The fitting rest 222 is flat with a pair of apertures 222' and is removably secured to the bottom fitting bed 240 by a pair of fasteners 223 inserted through the elongated centered slot 246 disposed on the bottom fitting bed 240 and the pair of apertures 222'. The pipe 260 is nominal size specific up to approximately 6 inches. The pipe 260 can also be up to approximately 3½ inches in the range of Class 150 to Class 600, in the range of approximately 4 inches to 10 inches in the range of Class 150 to Class 300 and can accommodate Class 900, 1,500 and 2,500 for relatively larger sized pipe fitting systems 200. The fitting 270 can be similar size and dimensions to the pipe 260. The cinch chains 280 are used to secure a pair of fitting cradles 230 to a fitting beam 282 or a speed rail (not shown). The fitting cradles 230 are provided with a plurality of receiving notches 284 to receive the cinch chains 280, which can also be secured to the fitting cradles 230 with a nut and bolt 286 disposed on a first end 288 of each of the cinch chains 280.

Figure 2D:
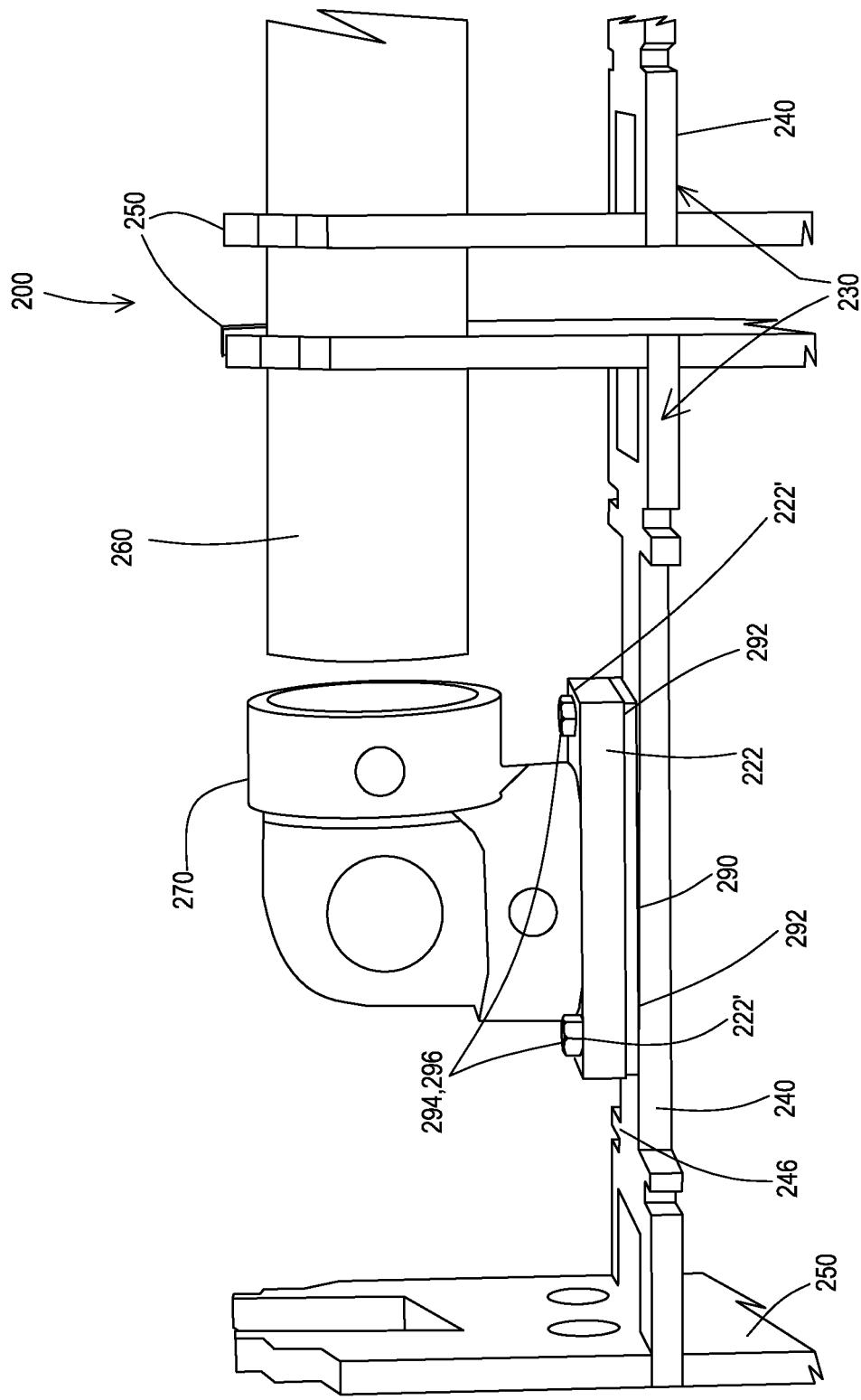
FIG. 2D illustrates a front environmental perspective view of a pipe fitting system with a pipe and a fitting, in accordance with one embodiment of the present invention.

FIG. 2D illustrates a front environmental perspective view of a pipe fitting system 200 with a fitting rest 222, a pipe 260 and a fitting 270, in accordance with one embodiment of the present invention. FIG. 2D includes a fitting cradle 230 with a bottom fitting bed 240 and a pair of positioning plates 250 that are similar to the fitting cradle 230, the bottom fitting bed 240 and the pair of positioning plates 250 illustrated and described in FIG. 2A and its description.

The fitting system 200 additionally includes one or more shims 290. The one or more shims 290 are placed between the fitting rest 222 and the bottom fitting bed 240 to adjust a height of the fitting 270. The one or more shims 290 are made of steel, high density polyethylene HDPE or other suitable material. The one or more shims 290 are also provided with a plurality of corresponding apertures 292 that allow a fastener 294 such as a nut and bolt 296 to extend through the corresponding apertures 292, the apertures 222' disposed on the fitting rest 222 and the elongated centered slot 246 disposed on the bottom fitting bed 240.

Figure 2E:
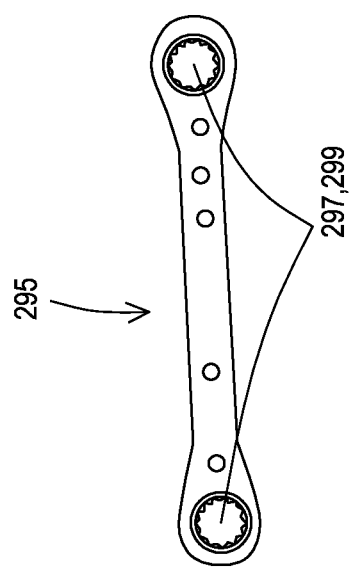
FIG. 2E illustrates a front environmental perspective view of a racquet wrench, in accordance with one embodiment of the present invention.

FIG. 2E illustrates a front environmental perspective view of a racquet wrench 295, in accordance with one embodiment of the present invention. The racquet wrench 295 is utilized to tighten and loosen any nuts and bolts associated with the pipe fitting system 200 such as the nut and bolt 286 disposed on the first end 288 of the cinch chains 280 and the one or more nuts and bolts 244 inserted through the fitting rest 222 that is removably secured to the bottom fitting bed 240 inserted through the elongated centered slot 246 disposed on the bottom fitting bed 240. The racquet wrench 295 can accommodate a plurality of different shaped nut heads and has a wrench head 297 on each end 299 of the racquet wrench 295, although any suitable racquet wrench 295 can be utilized with the fitting system 200. The racquet wrench 295 is made of durable high tensile stainless steel and can be made of other suitable material.

The pipe fitting system can be employed using personnel that possess relatively little pipefitter experience that will consistently produce a relatively extremely accurate fit. The pipe fitting system can be employed using only a welder without a helper or a fitter and still produce a relatively extremely accurate fit. The pipe fitting system will produce well-suited flange alignment and bolt-hole orientations (two holed orientation). The pipe fitting system will consistently produce a fit that is level, square and plumb. The pipe fitting system will always provide a relatively accurate and rapid fit for pipe to pipe, fittings to pipe, fittings to fittings, fittings to flanges, flanges to pipe and flanges to flanges pipe fittings. The pipe fitting system can be used in a shop or in a field environment with the same degree of relative precision for every fit. The pipe fitting system is designed to accommodate one size of pipe only with a plurality of different sized pipe fitting systems available to accommodate a plurality of different pipe sizes. The flange alignment and orientation is pressure rating specific (e.g. 150#). The pipe fitting system has no moving or adjustable parts, is relatively easy to set-up and will last a relatively long period of time, if properly cared for and maintained. The weight of the mid-sized individual fixture assembly is approximately the same as one and one half times the weight of a similar sized approximate 90 degree elbow.

A plurality of customized fixtures is included for fitting a tee, an approximate 45 degree elbow or a short radius approximate 90 degree elbow. Fittings that are longer or shorter (end-to-end or center-to-end) than the pipe fitting system can be positioned with shims to compensate for their difference in length. The pipe fitting system components can be used in the field in the same way that a work table is used in a shop. Pipe, fittings and flanges can be aligned and fit using centerline technology and provide accurate, straight, level, plumb, square, aligned and two-holed (bolt hole orientation where flange bolt holes repeatedly consistently straddle the natural centerlines). The pipe fitting system components will eliminate a need for pipefitter tools. Items such as two-hole pins, torpedo levels, centering punches, framing squares and one or more additional persons for assistance will no longer be required for a typical pipe fitting. After a quick set-up of the fitting beam, anyone could make multiple relatively well-suited fits without using other tools. Each time that a fixture is relocated (required if the type of fit changes) then a user would need to loosen the cinch chain, relocate the fixture, level and re-cinch the fixture (similar to a beveling machine).

The pipe fitting system fixtures are size and pressure rating specific and are powder coated the same color (e.g. all fixtures that relate to an approximate 6 inch pipe and approximate 6 inch, 150# flanges will be royal blue). Therefore, fixtures of a particular size and rating can relatively easily be identified if multiple sizes are on a job site. The pipe fitting system fixtures are fabricated with precise shop procedures to ensure that fittings will have a relatively very well-suited and precise fit. Plate members for fixtures are precision cut on a CNC plasma machine and are consistently produced in the same configuration. Plate fixtures are fusion welded with a Tungsten Inert Gas welding (TIG) process using a relatively minimal amount of filler rod. The pipe fitting system fixtures are manufactured using heavy angle blocks to hold the clamped pieces during the welding and cooling process. The angle blocks and clamps provide an adequate heat sink and allow for a minimum of welding draw. The fixtures are designed mathematically to hold flanges, fittings and pipes centered and square that are properly orientated and aligned for tack welding or production welding. Tack welding is the recommended use in order to free-up the fixtures for more fits. After fit and tack welding, the subject pieces can be welded out completely using jack stands with roller heads, a welding positioner (shop only) or any other method the welder chooses to perform the finished weld. Careful measurements must be made in order to compensate for draw when welding and the amount of draw for a particular size and type of weld is determined and compensated for if needed (i.e., cut and fit 1/16th of an inch more or less longer). Measurements are made again after welding cool down to determine the proper draw. Relative exact dimensions can be held by performing the complete weld while pieces are restrained in the pipe fitting system.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A pipe fitting system to fit a selected one of one or more pipes, one or more flanges and one or more fittings, comprising:
   one or more fitting cradles that each includes a bottom fitting bed and a pair of positioning plates, the bottom fitting bed has a first end, a second end and an elongated centered slot, the pair of positioning plates is perpendicularly attached to the first end and the second end of the bottom fitting bed;
   a fitting rest with a pair of apertures, the fitting rest is removably secured to the bottom fitting bed by a pair of fasteners inserted through the pair of apertures and the elongated centered slot disposed on the bottom fitting bed;
   a plurality of cinch chains each with a first end, the cinch chains are used to secure the one or more fitting cradles to a fitting beam; and
   a high tensile steel ratchet wrench to loosen and to tighten the fasteners of the pipe fitting system.

2. The pipe fitting system according to claim 1, wherein the one or more fitting cradles are set at a selected one of an approximate 90 degree angle and an approximate 180 degree angle.

3. The pipe fitting system according to claim 1, wherein the bottom fitting bed and the pair of positioning plates are cut with a high precision CNC laser machine.

4. The pipe fitting system according to claim 1, wherein the pair of positioning plates is perpendicularly TIG welded with tungsten inert gas with argon gas shielding to the first end and the second end of the bottom fitting bed.

5. The pipe fitting system according to claim 1, wherein the fitting rest is disposed at an angle of approximately 45 degrees relative to the bottom fitting bed and includes a flat triangular base, an attachment receiving surface, three screw receiving plates and three releasable attachment screws.

6. The pipe fitting system according to claim 5, wherein the flat triangular base is placed on the elongated centered slot of the bottom fitting bed.

7. The pipe fitting system according to claim 5, wherein the triangular base is removably attached to the bottom fitting bed with a securing screw and bolt, the securing screw and bolt is extended through an aperture disposed in the bottom of the triangular base and the elongated centered slot of the bottom fitting bed.

8. The pipe fitting system according to claim 5, wherein the attachment receiving surface is in contact with the selected one of one or more pipes, one or more flanges and one or more fittings.

9. The pipe fitting system according to claim 5, wherein the three screw receiving plates are equal distance around a front portion of the attachment receiving surface, with a threaded aperture disposed in each of the three screw receiving plates.

10. The pipe fitting system according to claim 5, wherein the three releasable attachment screws are threaded through the threaded aperture disposed on each of the three screw receiving plates to apply pressure on the selected one of one or more pipes, one or more flanges and one or more fittings, the three releasable attachment screws to secure the selected one of one or more pipes, one or more flanges and one or more fittings to the attachment receiving surface.

11. The pipe fitting system according to claim 1, wherein the pair of fasteners is a pair of nuts and bolts.

12. The pipe fitting system according to claim 1, wherein one or more shims are placed between the one or more fitting and the bottom fitting bed to adjust a height of the fitting rest.

13. The pipe fitting system according to claim 12, wherein the one or more shims are a selected one of steel and high density polyethylene.

14. The pipe fitting system according to claim 1, wherein the one or more pipes are nominal size specific up to 6 inches and are up to approximately 3½ inches in the range of Class 150 to Class 600.

15. The pipe fitting system according to claim 1, wherein the one or more pipes is in the range of approximately 4 inches to 10 inches and are in the range of Class 150 to Class 300.

16. The pipe fitting system according to claim 1, wherein the one or more pipes are selected from the group consisting of Class 900, 1,500 and 2,500.

17. The pipe fitting system according to claim 1, wherein the one or more fitting cradles are provided with a plurality of receiving notches to receive a nut and a bolt disposed on the first end of the cinch chains.

18. The pipe fitting system according to claim 1, wherein the pipe fitting system is made of steel.

19. The pipe fitting system according to claim 1, wherein the pipe fitting system is used in a shop.

20. The pipe fitting system according to claim 1, wherein the pipe fitting system is used in a field environment.

* * * * *